(12) United States Patent
Labitzke et al.

(10) Patent No.: US 7,679,219 B2
(45) Date of Patent: Mar. 16, 2010

(54) POWER SUPPLY DEVICE

(75) Inventors: Herbert Labitzke, Markgroeningen (DE); Andre Micko, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 463 days.

(21) Appl. No.: 10/590,236

(22) PCT Filed: Feb. 9, 2005

(86) PCT No.: PCT/EP2005/050570
§ 371 (c)(1),
(2), (4) Date: Jun. 8, 2007

(87) PCT Pub. No.: WO2005/081392
PCT Pub. Date: Sep. 1, 2005

(65) Prior Publication Data
US 2007/0284948 A1    Dec. 13, 2007

(30) Foreign Application Priority Data
Feb. 19, 2004    (DE) ................ 10 2004 008 433

(51) Int. Cl.
*H02J 1/12* (2006.01)
*H02K 7/20* (2006.01)
(52) U.S. Cl. ............. 307/84; 307/16; 307/45; 307/47; 307/76; 307/85; 290/8
(58) Field of Classification Search ........ 290/8; 307/16, 29, 44, 45, 47, 57, 67, 76, 78, 84, 307/85, 86
See application file for complete search history.

(56) References Cited

U.S. PATENT DOCUMENTS

| 3,069,555 | A | * | 12/1962 | Kessler ............... 307/87 |
| 4,539,515 | A | | 9/1985 | Morishita et al. |
| 4,788,486 | A | | 11/1988 | Mashino et al. |
| 5,097,165 | A | * | 3/1992 | Mashino et al. ......... 310/112 |

FOREIGN PATENT DOCUMENTS

| DE | 38 12 577 | 10/1989 |
| DE | 101 06 723 | 9/2002 |
| EP | 0 340 913 | 11/1989 |
| EP | 0 426 345 | 5/1991 |

* cited by examiner

*Primary Examiner*—Albert W Paladini
*Assistant Examiner*—Hal I Kaplan
(74) *Attorney, Agent, or Firm*—Kenyon & Kenyon LLP

(57) ABSTRACT

Power supply devices for vehicle electrical systems in particular, including two voltage systems, i.e., vehicle electrical systems, each having its own generator. The first generator and the battery belong to the same voltage system, and the second generator belongs to the second voltage system. If the two voltage systems were decoupled, the second generator would not have the excitation current required for starting, so means are consequently provided here to connect the second generator to a charge storage device after actuation of the ignition switch, thereby generating an excitation current; this charge storage device may also be the battery of the first voltage system and the connection is kept conductive until the second generator starts and is generating an output voltage.

16 Claims, 3 Drawing Sheets

POWER SUPPLY DEVICE

FIELD OF THE INVENTION

The present invention relates to power supply devices, in particular in vehicle electrical systems.

BACKGROUND INFORMATION

Traditional power supply devices in motor vehicles have a generator, a battery, and various electrical consumers of the vehicle electrical system. The generator is driven by the internal combustion engine of the vehicle via suitable connecting means, e.g., the belt drive, and supplies the electricity required to charge the battery and supply power to the consumers. The output voltage of the generator is regulated to the desired level by an assigned voltage regulator and/or generator regulator, actual output voltage $U1$ of the generator optionally being varied within certain limits and adapted to preselectable requirements.

The generators customarily used are separately energized three-phase generators having an excitation winding through which an excitation current flows that is supplied by the battery and is switched by the generator regulator after activation of the ignition switch of the vehicle ("ignition on"). In order for a generator to be able to "start" at all, it needs the excitation current from the battery in the start phase. The excitation current creates a magnetic field in the rotor of the generator, thereby inducing a voltage in the stator winding of the generator when the rotor is rotating.

Since vehicle electrical systems need different voltages to supply the various electrical consumers, motor vehicles are known to use power supply devices that include multiple voltage systems at different voltages. Such an automotive power supply device is described in German Patent Application No. DE 38 12 577, for example, and includes two generators supplying voltages $U1$ and $U2$ to charge storage devices, i.e., batteries, and the assigned electrical consumers of the vehicle electrical system. Each generator is assigned its own battery. There is no provision for complete decoupling of the individual voltage systems.

Another power supply for a vehicle electrical system using two generators is known from German Patent Application No. DE 101 06 723, in which a PWM inverter is provided for each generator designed as a three-phase generator having an excitation winding and stator windings, a connection to one battery at a time being establishable via this PWM inverter. The generators supply different output voltages via which two partial vehicle electrical systems are supplied with power. No details are given about the start phase of the generators.

SUMMARY OF THE INVENTION

With complete decoupling of the individual voltage systems, in particular two systems, the second generator does not have the excitation current required for starting. When using only one battery in particular, the second generator, i.e., the generator that is decoupled from the battery, does not have the excitation current required for starting. Therefore, an object of the present invention is to find a solution to this problem and ensure that after actuation of "ignition on," the second generator will also receive a sufficiently high excitation current that will allow it to be started reliably. This object is achieved by a power supply device according to the present invention.

The power supply device according to the present invention has the advantage that the excitation current required for starting is reliably supplied to the second generator, thereby ensuring complete functionality of the two generators. This advantage is achieved by providing additional connection options in the form of connecting means between the excitation winding of the second generator and a charge storage device, these means being switched at least temporarily so that a conducting connection is established. The conducting connection is advantageously begun with the operation of the ignition switch and is maintained until the generator has started and is generating an output current. In particular an additional connection is established between the voltage system together with the battery and the second generator, which does not belong to this voltage system.

It is advantageous in particular to establish the additional connection via a voltage transformer, which is advantageously designed as a bidirectional d.c./d.c. transformer and is thus able to conduct power in both directions and equalizes voltage differences prevailing in the two voltage systems, i.e., adjusts the voltages. It is then possible for two generators to supply power to the voltage system including the battery. The excitation current required for the second generator is supplied "in reverse" from the battery via the d.c./d.c. transformer.

In another advantageous embodiment of the present invention, the additional connection is established by a diode, using, if necessary, additional components, in particular a resistor. This has the advantage that decoupling is obtained when there is a low generator voltage on the second generator, whereas under the condition that the voltage of the second generator is higher than the voltage of the first, there is again decoupling of the two voltage systems. Advantageously, this does not require separate switching means.

In another advantageous embodiment of the present invention, the additional connection is established by a switch, either a relay or an electronic switch, advantageously a transistor switch. At "ignition on," the switch is closed and the connection to the battery is established, so that an excitation current may also flow in the second generator. After ramp-up of the second generator, the switch is opened again and the two voltage systems are again decoupled from one another. One of the two voltage systems may be advantageously supplied with power by both generators in parallel operation of the two generators, in which case the two generators are required to have the same output voltage.

If a generator regulator having a sense path to the first voltage system, i.e., vehicle electrical system, is used for the second generator, the excitation current for starting the second generator may flow over this sense path. In addition, a preselectable degree of coupling of the two voltage systems via an internal wiring of the sense path to the regulator may be established in an advantageous manner.

In another advantageous embodiment of the present invention, the excitation current for starting up the second generator is obtained from an additional charge storage device which is part of the second voltage system and is designed as an extra battery, a capacitor or a SuperCap, for example. Complete decoupling of the two voltage systems, i.e., vehicle electrical systems, is then possible.

DETAILED DESCRIPTION

Figure 1:
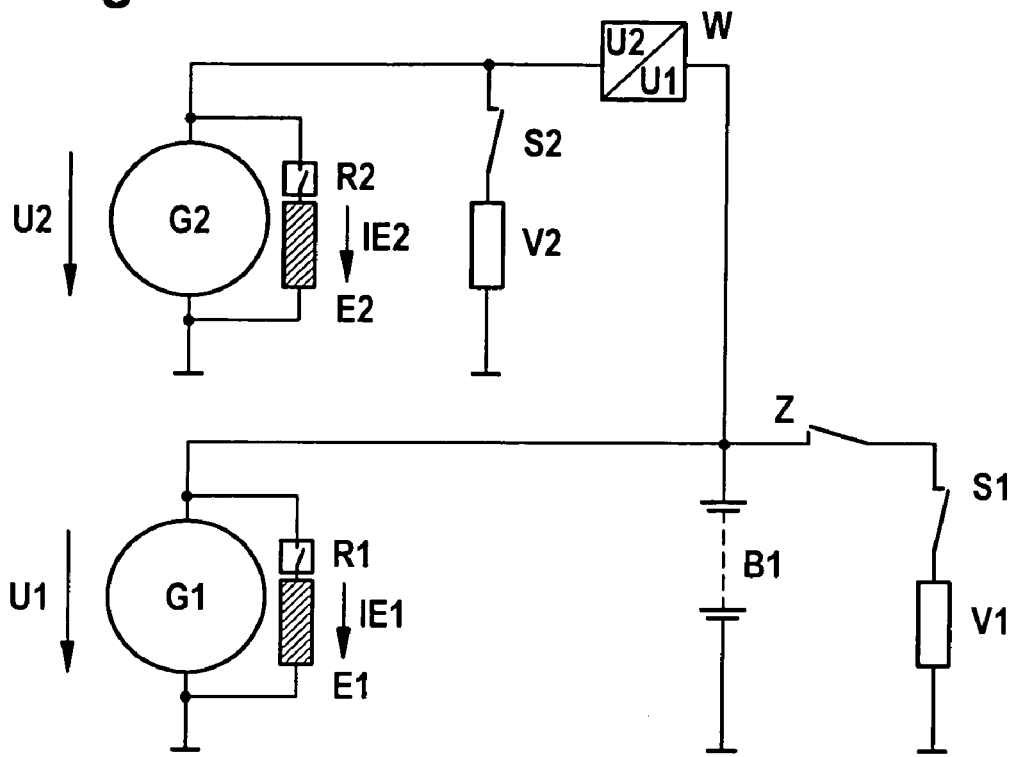
FIG. 1 shows a first exemplary embodiment of the present invention.

FIG. 1 shows a first exemplary embodiment of the present invention. A first generator G1, e.g., an externally regulated three-phase generator, is connected at the voltage end to the charge storage device, i.e., battery B1, and charges it during normal operation. Generator G1 and battery B1 also have a ground connection in the usual manner. Consumers V1 may be connected to battery B1 and/or generator G1 via ignition switch Z and any other switches S1 that are provided, if necessary. In addition to stator windings (not shown), generator G1 also includes an excitation winding E1 and a voltage regulator, i.e., generator regulator R1, which regulates the excitation current flowing through excitation winding E1 in a known way and thus regulates desired output voltage U1 of generator G1. These elements constitute a first voltage system, i.e., vehicle electrical system.

In addition, a second generator G2 having its own voltage regulator R2 and an excitation winding E2 is also present, this generator being used to supply power to consumers V2 which may be turned on or off via switches S2. The output voltage of generator G2 is regulated to a voltage U2 by voltage regulator R2. Switch S2, consumer V2, and generator G2 having excitation winding E2 and voltage regulator R2 form a second voltage system, i.e., vehicle electrical system, which is decoupled from the first voltage system, i.e., vehicle electrical system.

An additional connection between the two voltage systems, i.e., vehicle electrical systems, is established via a voltage transformer W, which is made possible by the approach according to the present invention. Without this additional connection, second generator G2 would not have excitation current IE2, which is required for starting, through excitation winding E2 with complete decoupling of the two voltage systems and the generator would not be able to start.

By coupling the two voltage systems via the additional connection by a voltage transformer W, excitation current IE2 required for starting may be supplied to generator G2 from battery B1. Excitation current IE2 required for second generator G2 is supplied in "reverse" via d.c./d.c. transformer W from battery B1. First generator G1, i.e., its excitation winding E1, is connected to battery B1 in the usual manner after operation of the ignition switch, so that an excitation current IE1 flows and allows the starting operation of generator G1.

Voltage transformer W, designed as a bidirectional d.c./d.c. transformer, for example, which is thus capable of delivering power in both directions and equalizes voltage differences prevailing in the two voltage systems, i.e., adjusts the voltages, also makes it possible to supply power to the first voltage system, which includes battery B1, via two generators G1 and G2. In the exemplary embodiment according to FIG. 1, a dual-voltage vehicle electrical system may be created, having U1=12 V and U2=36 V, for example, each a nominal voltage or U1=14 V and U2=42 V.

Figure 2:
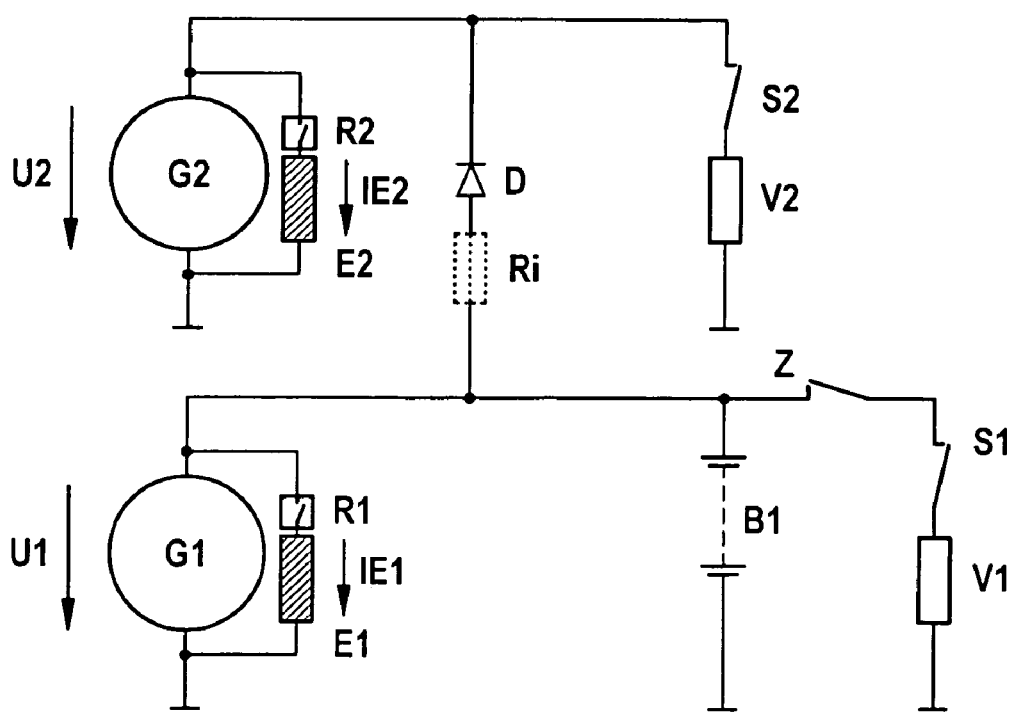
FIG. 2 shows a second exemplary embodiment of the present invention.

FIG. 2 shows another exemplary embodiment of the present invention. It includes the same components as in the exemplary embodiment according to FIG. 1 except for voltage transformer W. The additional connection between the two voltage systems and thus the coupling of the two voltage systems are established via a diode D and optionally a resistor R1 and other components, if necessary. Diode D is installed in such a way that the cathode is connected to generator G2 and the anode is connected to generator G1, so that the diode is able to conduct a current from battery B1 to excitation winding E2 if no voltage has been induced in generator G2. The excitation current necessary for starting is supplied from battery B1 to second generator G2 via this connection.

At a low generator voltage U2 of second generator G2, a connection of the second voltage system to the first is established, while under the condition that voltage U2 of second generator G2 is higher than voltage U1 of first generator G1, there is again decoupling of the two voltage systems, so to speak, because diode D is nonconducting when U2>U1. It is advantageous that separate switching means are not required here.

Figure 3:
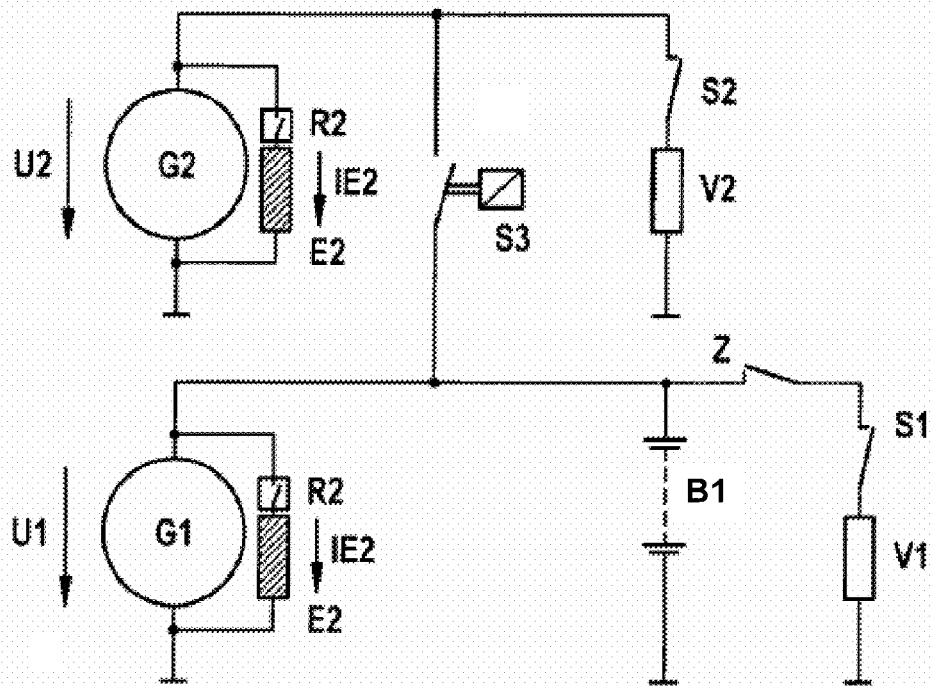
FIG. 3 shows a third exemplary embodiment of the present invention.

FIG. 3 shows a third exemplary embodiment of the present invention. Except for the voltage transformer, it includes the same components as the exemplary embodiment according to FIG. 1. The additional connection between the two voltage systems and thus excitation winding E2 of generator G2 to battery B1 is established via a relay or a switch S3 by which excitation current IE2 needed for starting is then supplied.

Switch S3 may also be an electronic switch, advantageously a transistor switch. At "ignition on," switch S3 is closed and the connection to battery B1 is established, so that an excitation current IE2 is also able to flow in second generator G2. After ramp-up of second generator G2, switch S3 is opened again and the two voltage systems are decoupled from one another again. One of the two voltage systems, in particular the first, may advantageously be supplied with power by both generators in the case of parallel operation of two generators G1 and G2, in which case the same output voltage (U1=U2) is then required of both generators G1 and G2, and switch S3 is closed. Switch S3 may be triggered via a control unit (not shown), for example.

Figure 4:
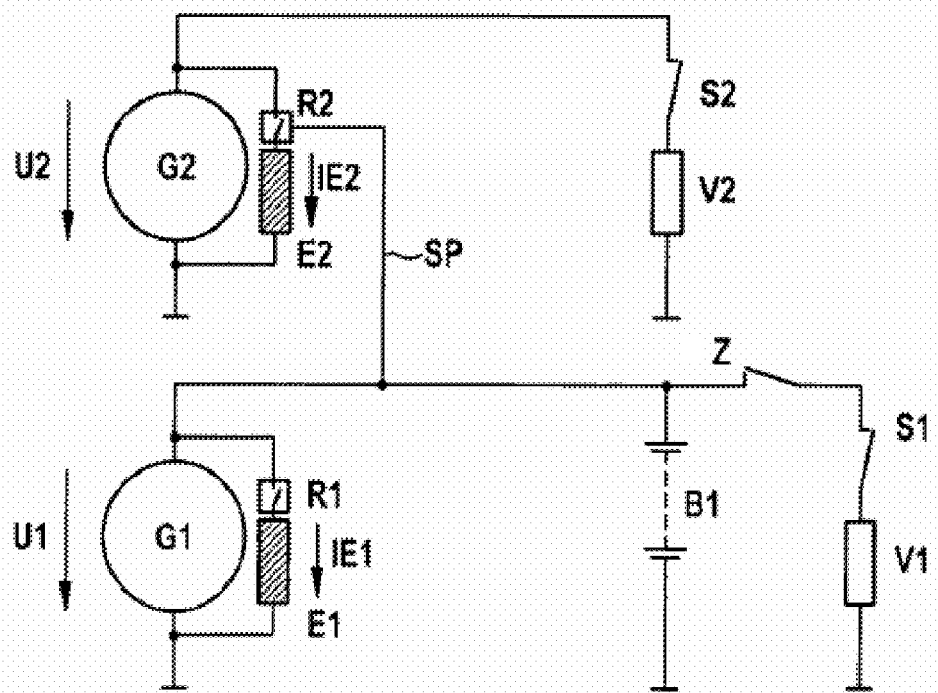
FIG. 4 shows a fourth exemplary embodiment of the present invention.

FIG. 4 shows a fourth exemplary embodiment of the present invention. Except for the voltage transformer, it includes the same components as the exemplary embodiment according to FIG. 1. The additional connection between the two voltage systems and thus excitation winding E2 of generator G2 to battery B1 is accomplished via a relay or a sense path SP via which excitation current IE2 needed for starting is then supplied. The prerequisite for this embodiment is that generator regulator R2 of generator G2 has a sense path SP to the first voltage system, i.e., vehicle electrical system. For example, voltage information is also relayed over such a sense path. The internal wiring of sense path SP is responsible for the degree of coupling of the two voltage systems.

Figure 5:
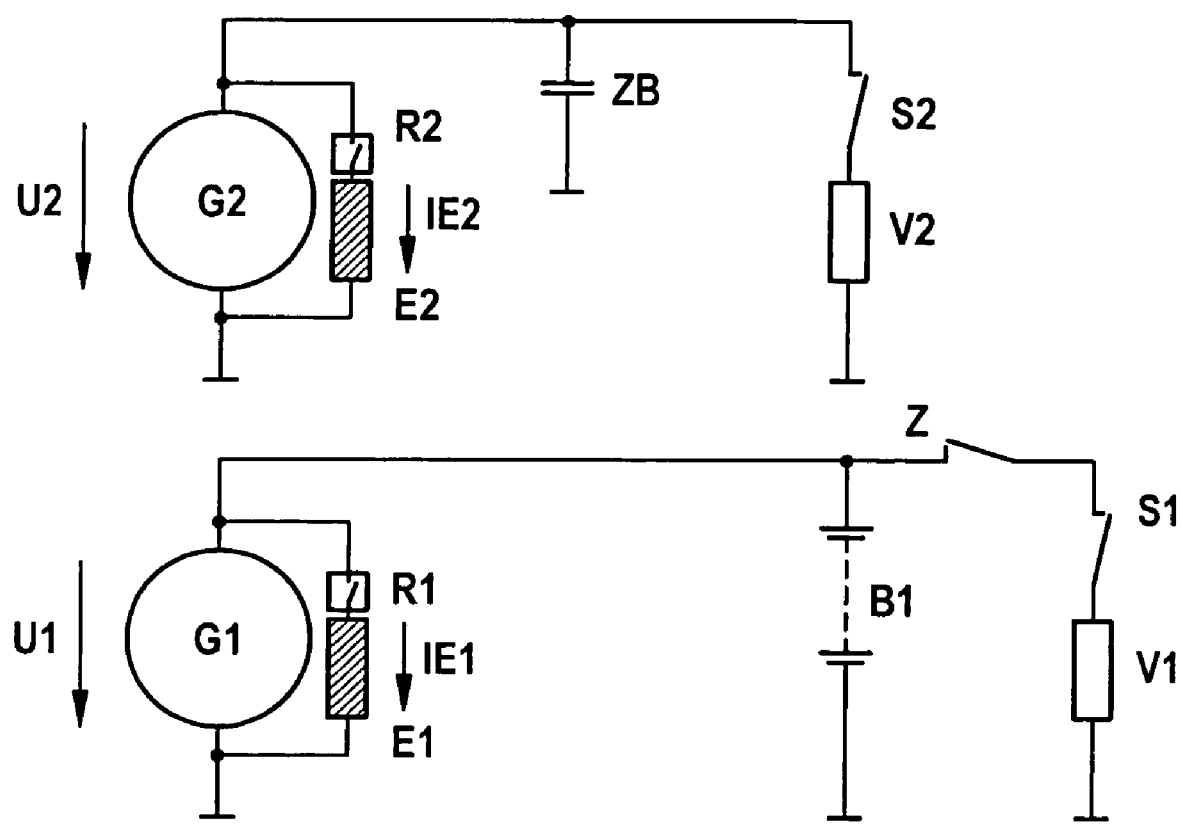
FIG. 5 shows a fifth exemplary embodiment of the present invention.

FIG. 5 illustrates a fifth exemplary embodiment of the present invention. Except for the voltage transformer, it includes the same components as the exemplary embodiment according to FIG. 1. However, there is no additional connection between the two voltage systems and thus excitation winding E2 of generator G2 to battery B1, so that there is complete decoupling of the two voltage systems. The required excitation current for starting generator G2 is supplied by an extra battery ZB in the second voltage system with a connection established after actuation of the ignition switch and maintained until the generator G2 has started and supplies an output voltage. A capacitor or a SuperCap may also be used as the extra battery.

At least to a certain extent, these exemplary embodiments may also be combined with one another with appropriate circuit adjustments.

What is claimed is:

1. A power supply device comprising:
   a first voltage system including at least one first generator, to which a first voltage regulator is assigned;
   a charge storage device connected to the first generator and consumers switchable to the charge storage device via an ignition switch;
   a second voltage system including at least one second generator, to which a second voltage regulator is assigned as well as switchable consumers the second voltage regulator regulating an excitation current flowing through an excitation winding of the second generator; and at least one connecting device situated between the excitation winding of the second generator and the charge storage device for connecting the excitation winding of the second generator to the charge storage device for generating the excitation current in the excitation winding of the second generator, wherein the connecting device includes a bidirectional d.c./d.c. voltage transformer.

2. The power device according to claim 1, wherein the power supply device is in a vehicle electrical system.

3. The power supply device according to claim 1, wherein the connecting device establishes a conducting connection at least temporarily between the excitation winding of the second generator and the charge storage device.

4. The power supply device according to claim 1, wherein the connecting device establishes a conducting connection after actuation of the ignition switch, at least until starting of the second generator.

5. The power supply device according to claim 1, wherein:
one side of the voltage transformer is at a first generator voltage in a range of 12-14 volts; and
the other side is at a second generator voltage in a range of 36-42 volts.

6. A power supply device comprising:
a first voltage system including at least one first generator, to which a first voltage regulator is assigned;
a charge storage device connected to the first generator and consumers switchable to the charge storage device via an ignition switch;
a second voltage system including at least one second generator, to which a second voltage regulator is assigned as well as switchable consumers the second voltage regulator regulating an excitation current flowing through an excitation winding of the second generator; and
at least one connecting device situated between the excitation winding of the second generator and the charge storage device for connecting the excitation winding of the second generator to the charge storage device for generating the excitation current in the excitation winding of the second generator, wherein the connecting device includes at least one diode and a resistor, an anode of the diode being connected to the charge storage device and a cathode being connected to the excitation winding of the second generator.

7. The power device according to claim 6, wherein the power supply device is in a vehicle electrical system.

8. The power supply device according to claim 6, wherein the connecting device establishes a conducting connection at least temporarily between the excitation winding of the second generator and the charge storage device.

9. The power supply device according to claim 6, wherein the connecting device establishes a conducting connection after actuation of the ignition switch, at least until starting of the second generator.

10. A power supply device comprising:
a first voltage system including at least one first generator, to which a first voltage regulator is assigned;
a first charge storage device connected to the first generator and consumers switchable to the battery via an ignition switch;
a second voltage system including at least one second generator, to which a second voltage regulator is assigned, as well as switchable consumers, the second voltage regulator regulating an excitation current flowing through an excitation winding of the second generator;
a second charge storage device connectable to the excitation winding of the second generator, the second charge storage device being one of a battery, a capacitor and a SuperCap; and
at least one connecting arrangement for connecting the excitation winding of the second generator to the second charge storage device for generating the excitation current in the excitation winding of the second generator, the connection being established after actuation of the ignition switch and maintained until the second generator has started and is supplying an output voltage.

11. The power device according to claim 10, wherein the power supply device is in a vehicle electrical system.

12. A method for power supply in a power supply device, the power supply device including: a first voltage system including at least one first voltage generator, to which a first voltage regulator is assigned; a charge storage device connected to the first generator, consumers switchable to the charge storage device via an ignition switch; a second voltage system including at least one second generator, to which a second voltage generator is assigned, as well as switchable consumers, the second voltage regulator regulating an excitation current flowing through an excitation winding of the second generator; and at least one connecting device situated between the excitation winding of the second generator and the charge storage device for connecting the excitation winding of the second generator to the charge storage device, the at least one connecting device including at least one diode and a resistor, an anode of the diode being connected to the charge storage device and a cathode being connected to the excitation winding of the second generator, the method comprising:
establishing a connection of the second voltage system to the first voltage system via the diode and resistor; and
terminating the connection when a voltage of the second generator exceeds a voltage of the first generator.

13. The method according to claim 12, wherein power is supplied in a vehicle electrical system.

14. The method of claim 12, further comprising:
operating the first generator and the second generator in parallel.

15. A method for power supply in a power supply device, the power supply device including: a first voltage system including at least one first voltage generator, to which a first voltage regulator is assigned; a charge storage device connected to the first generator, consumers switchable to the charge storage device via an ignition switch; a second voltage system including at least one second generator, to which a second voltage generator is assigned, as well as switchable consumers, the second voltage regulator regulating an excitation current flowing through an excitation winding of the second generator; and at least one connecting device situated between the excitation winding of the second generator and the charge storage device for connecting the excitation winding of the second generator to the charge storage device, the at least one connecting device including a bidirectional d.c./d.c. voltage transformer, the method comprising:
supplying an excitation current to the second generator from the charge storage device via the connecting device.

16. The method according to claim 15, wherein power is supplied in a vehicle electrical system.

* * * * *